US010547516B2

(12) United States Patent
Singh et al.

(10) Patent No.: US 10,547,516 B2
(45) Date of Patent: Jan. 28, 2020

(54) DETERMINING FOR AN OPTIMAL TIMEOUT VALUE TO MINIMIZE DOWNTIME FOR NODES IN A NETWORK-ACCESSIBLE SERVER SET

(71) Applicant: Microsoft Technology Licensing, LLC, Redmond, WA (US)

(72) Inventors: Sathyanarayana Singh, Renton, WA (US); Gaurav Jagtiani, Newcastle, WA (US); Rohit Pandey, Redmond, WA (US); Durmus Ugur Karatay, Seattle, WA (US); Gil Lapid Shafriri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

(21) Appl. No.: 15/640,114

(22) Filed: Jun. 30, 2017

(65) Prior Publication Data

US 2019/0007278 A1    Jan. 3, 2019

(51) Int. Cl.
*G06F 15/173*    (2006.01)
*H04L 12/24*    (2006.01)

(52) U.S. Cl.
CPC ........ *H04L 41/145* (2013.01); *H04L 41/5019* (2013.01)

(58) Field of Classification Search
CPC ............... H04L 41/145; H04L 41/0836; H04L 41/5019; H04L 43/0811; H04L 67/10; H04L 43/10
USPC ........................................................ 709/223
See application file for complete search history.

(56) References Cited

U.S. PATENT DOCUMENTS

| | | | |
|---|---|---|---|
| 6,907,460 B2* | 6/2005 | Loguinov | H04L 1/0001 370/229 |
| 7,860,234 B2 | 12/2010 | Patakula et al. | |
| 9,118,539 B2 | 8/2015 | Vasseur et al. | |
| 9,229,839 B2 | 1/2016 | Singh et al. | |
| 9,300,548 B2 | 3/2016 | Asthana et al. | |

(Continued)

OTHER PUBLICATIONS

Anand, Manu, "Always On: Architecture for High Availability Cloud Applications", In Proceedings of IEEE International Conference on Cloud Computing in Emerging Markets, Oct. 11, 2012, 5 pages.

(Continued)

*Primary Examiner* — Atta Khan
(74) *Attorney, Agent, or Firm* — Fiala & Weaver P.L.L.C.

(57) ABSTRACT

Methods, systems, and computer program products are described herein for minimizing the downtime for nodes in a network-accessible server set. The downtime may be minimized by determining an optimal timeout value for which a fabric controller waits to perform a recovery action. The optimal timeout value may be determined for each cluster in the network-accessible server set. The optimal timeout value advantageously reduces the overall downtime for customer workloads running on a node for which contact has been lost. The optimal timeout value for each cluster may be based on a predictive model based on the observed historical patterns of the nodes within that cluster. In the event that an optimal timeout value is not determined for a particular cluster (e.g., due to a lack of observed historical patterns), the fabric controller may fall back to a less than optimal timeout value.

20 Claims, 8 Drawing Sheets

(56) References Cited

U.S. PATENT DOCUMENTS

| | | | | |
|---|---|---|---|---|
| 9,542,296 | B1 | 1/2017 | Engers et al. | |
| 2003/0225880 | A1* | 12/2003 | Srivastava | G06F 11/326 709/224 |
| 2007/0255822 | A1* | 11/2007 | Thiel | H04L 41/0668 709/224 |
| 2012/0124431 | A1* | 5/2012 | Bauer | H04L 41/0663 714/55 |
| 2015/0067401 | A1* | 3/2015 | Ichikawa | G06F 11/0766 714/37 |
| 2015/0149814 | A1* | 5/2015 | Ren | G06F 11/2028 714/4.11 |
| 2015/0288569 | A1 | 10/2015 | Agarwal et al. | |

OTHER PUBLICATIONS

"HP OneView 2.0 User Guide", http://h20564.www2.hpe.com/hpsc/doc/public/display?docId=c04765114, Published on: Oct. 2015, 389 pages.

Kleiber, et al., "Statistical Size Distributions in Economics and Actuarial Sciences", In Publication of John Wiley & Sons, Published on: Sep. 4, 2003.

Sadhwani, et al., "Analyzing Personalized Policies for Online Biometric Verification", In Journal of PLOS One, vol. 9, Issue 5, May 1, 2014, pp. 1-11.

"Machine Learning", https://azure.microsoft.com/en-us/services/machine-learning/, Retrieved on: Apr. 13, 2017, 8 pages.

"International Search Report and Written Opinion Issued in PCT Application No. PCT/US2018/035246", dated Sep. 6, 2018, 10 Pages.

* cited by examiner

| SOURCE | TARGET | | | | | |
|---|---|---|---|---|---|---|
| | Ready | Raw | Booting | PoweringON | Unhealthy | Dead |
| Raw | $1.44 \times 10^{-3}$ | 0.00 | $1.75 \times 10^{-1}$ | $2.68 \times 10^{-2}$ | $4.20 \times 10^{-2}$ | 0.00 |
| Booting | $3.92 \times 10^{2}$ | $2.20 \times 10^{2}$ | 0.00 | $1.35 \times 10^{3}$ | 0.00 | $1.00 \times 10^{-3}$ |
| PoweringOn | $4.50 \times 10^{2}$ | $1.67 \times 10^{3}$ | 0.00 | 0.00 | 0.00 | 0.00 |
| Unhealthy | $3.44 \times 10^{3}$ | $3.33 \times 10^{2}$ | $6.40 \times 10^{2}$ | $1.04 \times 10^{3}$ | 0.00 | 0.00 |
| Dead | 0.00 | 0.00 | 0.00 | 0.00 | 0.00 | 0.00 |

FIG. 2A

| SOURCE | TARGET | | | | | |
|---|---|---|---|---|---|---|
| | Ready | Raw | Booting | PoweringON | Unhealthy | Dead |
| Raw | $9.91 \times 10^{-1}$ | 0.00 | $1.75 \times 10^{-4}$ | $1.07 \times 10^{-3}$ | $8.54 \times 10^{-5}$ | 0.00 |
| Booting | $9.57 \times 10^{-1}$ | $1.19 \times 10^{-4}$ | 0.00 | $3.69 \times 10^{-2}$ | 0.00 | $8.94 \times 10^{-4}$ |
| PoweringOn | $4.04 \times 10^{-1}$ | $4.85 \times 10^{-1}$ | $2.13 \times 10^{-4}$ | 0.00 | 0.00 | $2.13 \times 10^{-4}$ |
| Unhealthy | $9.85 \times 10^{-1}$ | $5.41 \times 10^{-3}$ | $2.94 \times 10^{-3}$ | $9.51 \times 10^{-3}$ | 0.00 | 0.00 |
| Dead | 0.00 | 0.00 | 0.00 | 0.00 | 0.00 | 0.00 |

FIG. 2B

DETERMINING FOR AN OPTIMAL TIMEOUT VALUE TO MINIMIZE DOWNTIME FOR NODES IN A NETWORK-ACCESSIBLE SERVER SET

BACKGROUND

A cloud-computing environment can comprise a large number (e.g., hundreds of thousands) of servers (or "nodes"), each being configured to execute several virtual machines. To deliver promised uptime service level agreements (SLAs) to customers, the nodes are kept operational, with as little downtime as possible. Various factors can cause downtime, such as planned maintenance, system failures, communication failures, etc. The component that causes downtime also determines the effect of the downtime. For example, in the case of the failure of a virtual machine (an emulation of a computer system), only one virtual machine is affected. However, in the case of a node failure, all of the virtual machines hosted on that node are affected. To meet the SLAs contracted to customers, the downtime caused by higher level components, such as nodes, should be kept to a minimum.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A cloud-computing environment (referred herein as a network-accessible server set) may comprise a cluster of servers (or "nodes"). Each cluster may include a fabric controller that manages and/or monitors each of the nodes located therein. A period of time (or timeout value) for which the fabric controller waits to perform a recovery action for a node is determined, which achieves a balance between competing factors (e.g., performing a recovery action versus waiting). The period of time advantageously reduces the overall downtime for customer workloads running on a node for which contact has been lost. The period of time may be determined for each cluster in the network-accessible server set. The period of time for each cluster may be based on a predictive model based on the observed historical patterns of the nodes within that cluster. In the event that a period of time is not determined for a particular cluster (e.g., due to a lack of observed historical patterns), the fabric controller may fall back to a less than optimal period of time. For example, the fabric controller may fall back to a period of time determined at the datacenter level of the network-accessible server set or a statically-configured (i.e., default) period of time.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIGS. 2A and 2B show example records maintained by a fabric controller, according to example embodiments.

Figure 1:
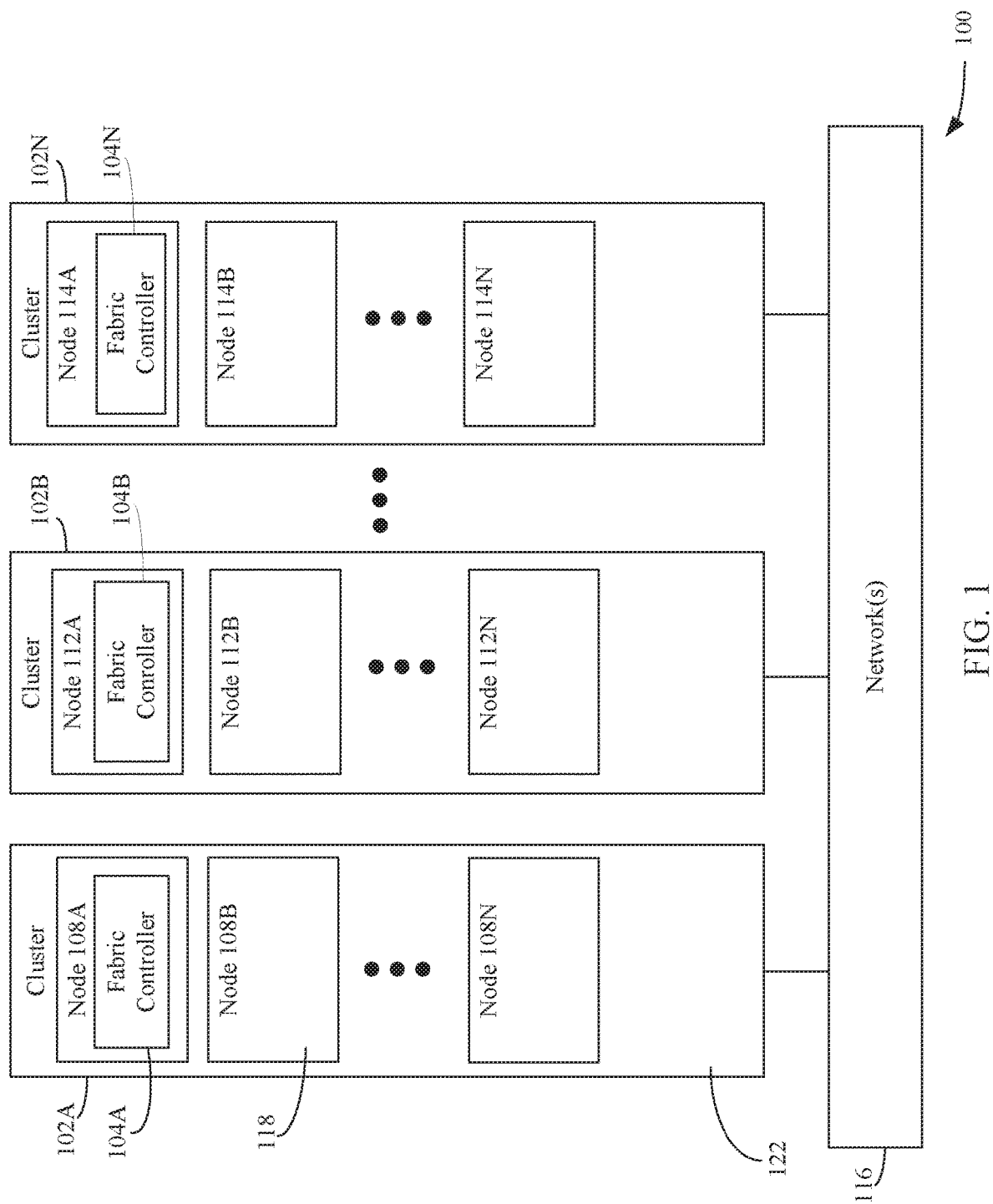
FIG. 1 is a block diagram of an example system for determining a timeout value to minimize downtime for nodes in a network-accessible server set in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Minimizing Downtime for Nodes in a Network-Accessible Server Set

A. Timeout Value Determination

A cloud-computing environment (referred herein as a network-accessible server set) may comprise a cluster of servers (or "nodes"). Each cluster may include a fabric controller that manages and/or monitors each of the nodes located therein. If the fabric controller loses contact with a node, it loses the ability to perform management functions for that node. In some cases, the node may self-recover, and the fabric controller may regain control automatically. In other cases, the node does not self-recover, and the fabric controller initiates a recovery action (such as rebooting the node) to regain control. In certain embodiments, the fabric controller waits a statically-configured, fixed (or default) period of time before initiating the recovery action. However, the nodes managed by the fabric controller may each host a variety of different types of workloads, and therefore, the statically-configured amount to time may not be desired for such nodes.

For example, suppose contact is lost with a particular node. Every second the fabric controller waits without initiating a recovery action is an additional second of downtime if the node does not self-recover. Thus, waiting for a long duration for nodes that are not likely to self-recover incurs a penalty. However, the solution is not necessarily to immediately reboot as soon as contact is lost with a node. This is because, as described above, nodes may self-recover in a short duration which may be much less than the time it would take to reboot them. Thus, performing a recovery action on these nodes (which are going to recover on their own anyway) would simply increase the downtime.

To overcome such deficiencies, a period of time (or timeout value) for which the fabric controller waits to perform a recovery action is determined, which achieves a balance between the above-described competing factors (i.e., performing a recovery action versus waiting). The determined period of time ("recovery wait period") advantageously reduces the overall downtime for customer workloads running on a node for which contact has been lost. Such a period of time may be determined for each cluster in the network-accessible server set. The period of time for each cluster may be based on a predictive model based on the observed historical patterns of the nodes within that cluster. In the event that such a period of time is not determined for a particular cluster (e.g., due to a lack of observed historical patterns), the fabric controller may fall back to a less optimal period of time value. For example, the fabric controller may fall back to a period of time determined at the datacenter level of the network-accessible server set or a statically-configured (i.e., default) period of time.

FIG. 1 shows a block diagram of an example system 100 for determining an optimal timeout value to minimize downtime for nodes in a network-accessible server set, according to an example embodiment. An "optimal" timeout value, as referenced herein, is a timeout value for recovery wait that is determined (e.g., calculated/calibrated) to improve wait time performance relative to using a static timeout value for recovery wait. As shown in FIG. 1, system 100 includes a plurality of clusters 102A, 102B, and 102N. Each of clusters 102A, 102B, and 102N may be communicatively connected to each other via one or more network(s) 116. Network(s) 116 may comprise one or more networks such as local area networks (LANs), wide area networks (WANs), enterprise networks, the Internet, etc., and may include one or more of wired and/or wireless portions.

Clusters 102A, 102B, and 102N may form a network-accessible server set. Each of clusters 102A, 102B, and 102N may comprise a group of one or more nodes. For example, as shown in FIG. 1, cluster 102A includes nodes 108A-108N, cluster 102B includes nodes 112A-112N, and cluster 102N includes nodes 114A-114N. Each of nodes 108A-108N, 112A-112N and/or 114A-114N are accessible via network(s) 116 (e.g., in a "cloud-based" embodiment) to build, deploy, and manage applications and services.

In an embodiment, one or more of clusters 102A, 102B, and 102N may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 102A, 102B, and 102N may be a datacenter in a distributed collection of datacenters.

Each of node(s) 108A-108N, 112A-112N, and 114A-114N may be configured to execute one or more software applications (or "applications") and/or manage hardware resources (e.g., processors, memory, etc.), which may be utilized by users (e.g., customers) of the network-accessible server set. Node(s) 108A-108N, 112A-112N, and 114A-114N may also be configured for specific uses. For example, as shown in FIG. 1, node 108A is configured to execute a fabric controller 104A, node 112A is configured to execute a fabric controller 104A, and node 114A is configured to execute a fabric controller 104N.

Each of fabric controllers 104A, 104B, and 104N may be configured to monitor and/or control the nodes co-located within its cluster. For example, fabric controller 104A may be configured to monitor and/or control nodes 108B-108N, fabric controller 104B may be configured to monitor and/or control nodes 112B-112N, and fabric controller 104N may be configured to monitor and/or control nodes 114B-114N. For instance, each of fabric controllers 104A, 104B, and 104N may be configured to provision one or more virtual machines on its associated nodes, update software executing on its associated nodes, monitor the operational states of its associated nodes, etc.

When monitoring the operational states of its associated nodes, each of fabric controllers 104A, 104B, and 104N may be configured to receive a periodic status signal from each of its associated nodes. For example, fabric controller 104A may be configured to receive a periodic status signal from each of nodes 108B-108N, fabric controller 104B may be configured to receive a periodic status signal from each of nodes 112B-112N, and fabric controller 104N may be configured to receive a periodic status signal from each of nodes 114B-114N. Each of nodes 108B-108N, 112B-112N, and 114B-114N may be configured to periodically provide a status signal to its corresponding fabric controller when it is in a fully operational state (e.g., the node is powered up, booted up, and is performing (or ready to perform) one or more tasks for which it is configured (e.g., executing a virtual machine)). Each of nodes 108B-108N, 112B-112N, and 114B-114N may provide the status signal to its corresponding fabric controller responsive to a request provided to the node by the fabric controller. When a fabric controller receives a status signal from a node, the fabric controller determines that that node is in a fully operational (or "ready") state. In the event that the fabric controller does not receive a status signal before expiration of a predetermined time interval (e.g., which may begin upon the fabric controller providing a request for the status signal), the fabric controller may determine that a loss of communication has occurred with the node and designates the node as being in an unoperational (or "unhealthy") state.

A node may enter into an unhealthy state as a result of heavy computational load, a software failure, a hardware failure, etc. Upon a node entering the unhealthy state, the corresponding fabric controller may wait for a default period of time (e.g., the fabric controller may wait a period of time corresponding to a default timeout value (e.g., 10 minutes) to expire) in hopes that the node self-recovers. Upon expiration of the default period of time, the fabric controller may intervene and perform a recovery action. One such recovery action is providing a signal to the unhealthy node that causes that node to reboot, which results in an additional amount of downtime (e.g., the rebooting process may take 5 minutes in addition to the 10 minutes of waiting for the node to self-recover).

Embodiments described herein determine an optimal timeout value (also referred to as an "intervention threshold"), which a fabric controller uses to determine how long it should wait before performing a recovery action with respect to an unhealthy node. The determination may be based on an analysis of the cost of waiting for a node to self-recover and the cost of intervention by the fabric controller by performing a recovery action. The foregoing may be achieved by analyzing historical data associated with each of nodes 108B-108N, 112B-112N and node 114B-114N on a cluster-by-cluster basis. The historical data for each cluster may comprise a record of one or more operational states into which the nodes located therein entered and/or a record of an amount of time in which the nodes were in each of the operational state(s). Fabric controller 104A may be configured to create and/or maintain the records for nodes 108B-108N, fabric controller 104B may be configured to create and/or maintain the records for nodes 112B-112N, and fabric controller 104N may be configured to create and/or maintain the records for nodes 114B-112N.

Each of nodes 108B-108N, 112B-112N, and 114B-114N may be configured to enter into a plurality of operational states (in addition to the ready and unhealthy states). Each of nodes 108B-108N, 112B-112N, and 114B-114N may enter such states upon its corresponding fabric controller initiating a recovery action. Such states include, but are not limited to, a "raw" state, a "booting" state, a "powering on" state, and a "dead" state. Each of fabric controllers 104A, 104B, and 104N may determine that an associated node is in a raw state when the node is activated for the first time by the corresponding fabric controller (e.g., as a result of a failover event where a new instance of the fabric controller takes over from the previous instance). Each of fabric controllers 104A, 104B, and 104N may determine that an associated node is in a powering on state when the intervention threshold is reached and the fabric controller performs the recovery action (e.g., by sending a signal that causes the node to reboot). Each of fabric controllers 104A, 104B, and 104N may determine that an associated node is in a booting state when the node initiates its booting process (e.g., after receiving the signal from the fabric controller that causes the node to reboot). In accordance with an embodiment, each of nodes 108B-108N, nodes 112B-112N, and nodes 114A-114N may be configured to perform a network boot, where the node provides a request for instructions for booting and/or software (e.g., an operating system image) required for booting from a bootup service (not shown) via network(s) 116. In accordance with an embodiment, the request is a pre-boot execution environment (PXE) request. The bootup service may provide the request to the fabric controller associated with the node that provided the request, and the fabric controller may determine that the node is in the booting state upon receiving the request. Each of fabric controllers 104A, 104B, and 104N may determine that an associated node is in a dead state if the fabric controller is unable to recover the node (e.g., the node is unable to provide a status signal even after an attempt to reboot the node is performed).

Every time a node switches from one state to another, the corresponding fabric controller may log an entry in the record detailing the duration spent in the former state. The record may be created by monitoring the state transitions of the nodes during a predetermined intervention threshold (e.g., a default intervention threshold, for example, 10 minutes). For instance, FIG. 2A shows an example record 200A maintained by a fabric controller for nodes located within a particular cluster in accordance with an embodiment. The source column of record 200A represents the former state in which the nodes were in and the target columns represent the states to which the nodes transitioned from the former state. The numerical values in record 200A represent an average time (e.g., in seconds) that the nodes resided in a particular source state before transitioning to a particular target state. The numerical values may represent an aggregation of average times for the nodes located within the cluster. As shown in FIG. 2A, record 200A maintains historical data for each of the raw state, the booting state, the powering on state, the unhealthy state, and the dead state. However, it is noted that record 200A may maintain historical data for other states, in addition to or in lieu of, the states shown in FIG. 2A. It is further noted that record 200A may maintain historical data for a subset of the states shown in FIG. 2A.

FIG. 2B shows another example record 200B maintained by a fabric controller for nodes located within a particular cluster in accordance with another embodiment. The numerical values in record 200B represent the probability that the particular nodes will transition from a particular source state to a particular target state. The numerical values may represent an aggregation of probabilities for the nodes located within the cluster. As shown in FIG. 2B, record 200B maintains historical data for each of the raw state, the booting state, the powering on state, the unhealthy state, and the dead state. However, it is noted that record 200B may maintain historical data for other states, in addition to or in lieu of, the states shown in FIG. 2B. It is further noted that record 200B may maintain historical data for a subset of the states shown in FIG. 2B.

To determine the cost of self-recovery for nodes within a particular cluster, records 200A and/or 200B may be analyzed to determine the average time it takes for such nodes to transition from the unhealthy state to the ready state in accordance with the default intervention threshold. The average time can be used to create a distribution of durations for the unhealthy state-to-ready state transition. In particular, a heavy-tailed probability distribution, such as a Lomax-based, a Weibull-based, and/or log-normal distribution model, may be fit to the average times using a censored maximum likelihood estimation technique (taking into account that samples for greater than the intervention threshold (e.g., greater than the default intervention threshold) are not available). The foregoing provides a model (e.g., a probability density function) that predicts the likelihood that the nodes will self-recover without performing a recovery action for any given time period. As described below, the probability density function is used to determine the optimal timeout value a fabric controller uses to determine whether or not a recovery action is to be taken with respect to an unhealthy node.

To estimate the recovery action cost for nodes within a cluster (i.e., the time it takes for a node to recover as a result of a fabric controller performing a recovery action (also referred to as an intervention cost or reboot cost)), all the states to which a node transitions during a reboot must be taken into account, as nodes do not necessarily go directly from an unhealthy state to the ready state during reboot, but instead may go to various intermediate states before recovery. The historical data collected via records 200A and/or 200B may be analyzed to determine a record indicative of the probability that a node transitions from a particular source state to a particular target state. Using records 200A and 200B, a recovery action cost may be obtained. For example, the recovery action cost may be obtained by using Markov chains. The Markov chains may be used to model the state transitioning process for the nodes of a cluster. Markov chains are used to model probabilistic processes, where the next state of a node being represented by the chains depend on the current state and not the history of previous states visited.

The probabilities of going from a given state i (i.e., a source state as shown in FIG. 2B) to another state j (i.e., a target state as shown in FIG. 2B) in a single transition (i.e., powering on state to ready state) may be denoted by $P_{i,j}$. Hence, a $P_{n \times n}$ transition matrix may be obtained by describing the probability of moving between states. This is represented by record 200B of FIG. 2B.

There is also a downtime cost associated with transitioning from state i to state j. This downtime may be denoted by $T_{i,j}$. Hence, a $T_{n,n}$ matrix is obtained. This is represented by record 200A in FIG. 2A. The ready state may be defined as the "absorbing state," such that $P_{Ready,j}=0$ and $T_{Ready,j}=0$. The other states are referred to as "transient" states. A vector t, where $t_i$ gives the average duration to arrive to the ready state from state i may be defined. The foregoing may be used to describe a system of equations for finding $t_i$. The system of equations is provided below:

$$t_i = \Sigma_{j=1}^n P_{i,j}(T_{i,j}+t_j) \quad \text{Equation 1}$$

$$t_i - \Sigma_{j=1}^n P_{i,j}t_j = \Sigma_{j=1}^n P_{i,j}T_{i,j} \quad \text{Equation 2}$$

Equations 1 and 2 represent a system of (n−1) linear equations because $t_{Ready}=0$. It can be represented in matrix form, as shown in Equation 3 below:

$$(\Pi-Q)t=(P\odot T)\cdot 1 \quad \text{Equation 3}$$

where, $\Pi_{(n-1)\times(n-1)}$ is the identity matrix, $Q_{(n-1)\times(n-1)}$ is the transition matrix of transient states, where the rows sum to less than 1 as a result of the Ready column being removed from P, $\odot$ is the Hadamard product of matrices where two same-sized matrices are multiplied element-by-element, and $1_{n-1}$ is a vector of ones.

After solving Equation 3, t, may be used to find the average time it takes a node from intervening states to the ready state, which provides an estimate for the recovery action cost $C_{int}$ (also referred to as the cost of intervention). As described below, the recovery cost estimate $C_{int}$ is used to determine the optimal timeout value a fabric controller uses to determine whether or not a recovery action is to be taken with respect to an unhealthy node.

After the self-recovery cost and the recovery action cost are determined for nodes within a cluster, an optimal intervention threshold (or timeout value) may be obtained based on an expected downtime per node. For example, the downtime (DT) suffered by a node may depend on the time that a node takes to self-recover. If self-recovery takes less than the invention threshold that a fabric controller is currently set to, no action is taken and the downtime is equal to the self-recovery time. Otherwise, the fabric controller intervenes and the total downtime accrued is the intervention threshold and the cost of intervention $C_{int}$. The foregoing may be represented by Equation 4, which is shown below:

$$\begin{cases} T, & \text{if } T < \tau \\ (\tau + C_{int}), & \text{otherwise} \end{cases} \quad \text{Equation 4}$$

where T is the time to it takes for a node to self-recover and τ is the intervention threshold that the fabric controller is currently set to.

The expected downtime per node can be defined in accordance with Equation 5, which is shown below:

$$\mathbb{E}[DT]=P(T\leq\tau)\mathbb{E}[T|T<\tau]+P(T>\tau)(\tau+C_{int}) \quad \text{Equation 5}$$

where $\mathbb{E}[DT]$ is the expected downtime that a node in a cluster will incur given intervention threshold τ. Equation 5 may be described as a simple expectation of two possibilities: either the node will recover before the threshold τ, or the fabric controller will intervene and perform a recover cost, thereby incurring a total cost of $(\tau+C_{int})$.

The probability density function (that predicts the likelihood that a node for a particular cluster will self-recover without performing a recovery action for any given time period) of T may be represented as $f_T(t)$. Substituting the probability density function into Equation 5, results in Equation 6, which is shown below:

$$\mathbb{E}[DT]=\int_o^\tau tf_T(t)dt+[1-P(T\leq\tau)]\times[\tau+C_{int}] \quad \text{Equation 6}$$

To find the optimum intervention threshold τ that minimizes $\mathbb{E}[DT]$, the derivative of Equation 6 is taken and is set to zero, as shown below in Equation 7:

$$0 = \frac{dE[DT]}{d\tau}, \quad \text{Equation 7}$$

$$0 = \tau f_T(\tau) - f_T(\tau)\times[\tau+C_{int}]+[1-P(T\leq\tau)],$$

$$1 = P(T\leq\tau) = f_T(\tau)C_{int},$$

$$\frac{f_T(\tau)}{P(T\geq\tau)} = \frac{1}{C_{int}}$$

The left-hand side of Equation 7 is referred to as the "hazard rate" of distributions describing the arrival times of certain events. The events being modeled are generally negative in nature, hence the "hazard" in the name. Nevertheless, in the present case, the event anticipated is positive, namely a node returning to the ready state. In Equation 7, the rate is described as the inverse of the average time until the next event arrives as seen from the current state, instantaneously. Note that for most distributions, this rate itself will change with time so the average time until the next event will not actually be the inverse of the instantaneous rate. The right-hand side of Equation 7 is the inverse of the (deterministic) time it takes for a node to return to the ready state after invention from the fabric controller. Hence, the optimal τ is achieved when the rates corresponding to the two competing processes are equal.

Once the optimal intervention threshold is calculated for a particular cluster, the associated fabric controller may utilize the optimum threshold to determine when to perform a recovery action with respect to a node that is gone to an unhealthy state. In particular, upon reaching an optimal intervention threshold, the fabric controller may perform the recovery action (e.g., the fabric controller may provide a signal to the unhealthy node that causes it to reboot).

In accordance with an embodiment, the optimal intervention threshold is determined using non-parametric historical data. For example, the fabric controller may be configured to set the intervention threshold to different values and monitor the downtime experienced by its associated nodes for each of the different timeout values. For instance, initially the fabric controller may set the intervention threshold to the default threshold value (e.g., 10 minutes). The fabric controller may monitor its associated nodes for a predetermined time period (e.g., 1 day, 1 week, 1 month, etc.) and determine the downtime experienced for each associated node that transitioned to the unhealthy state. The fabric controller may average the downtime experienced by each such node to determine an average downtime experienced. The fabric controller may then iteratively repeat this process for different threshold values (e.g., in intervals of 0.1 minutes) to determine the average downtime experienced for nodes that transitioned to the unhealthy state when using each of the different threshold values. The fabric controller may determine the optimal intervention threshold to be the intervention threshold that resulted in the lowest average downtime experienced.

Using the non-parametric model is advantageous in that the optimum intervention threshold is deterministically-ascertained using real world data, whereas the probabilistic model is based on a prediction as to the average downtime experienced by nodes for different intervention thresholds.

Each of fabric controllers 104A, 104B, and 104N may be configured to periodically reassess the intervention threshold. In the event that the current intervention threshold was ascertained using the non-parametric model, data indicating the average downtime experienced by the nodes for intervention thresholds greater than the current intervention threshold will not be available. For example, if the current intervention threshold is set 3 minutes, the behavior of the nodes is not ascertainable for intervention thresholds greater than 3 minutes due to the fabric controller initiating a recovery action upon the 3 minutes expiring. Thus, when reassessing which intervention threshold is to be used, each of fabric controllers 104A, 104B, and 104N may switch to using the probabilistic method to determine the optimum intervention threshold.

Figure 3:
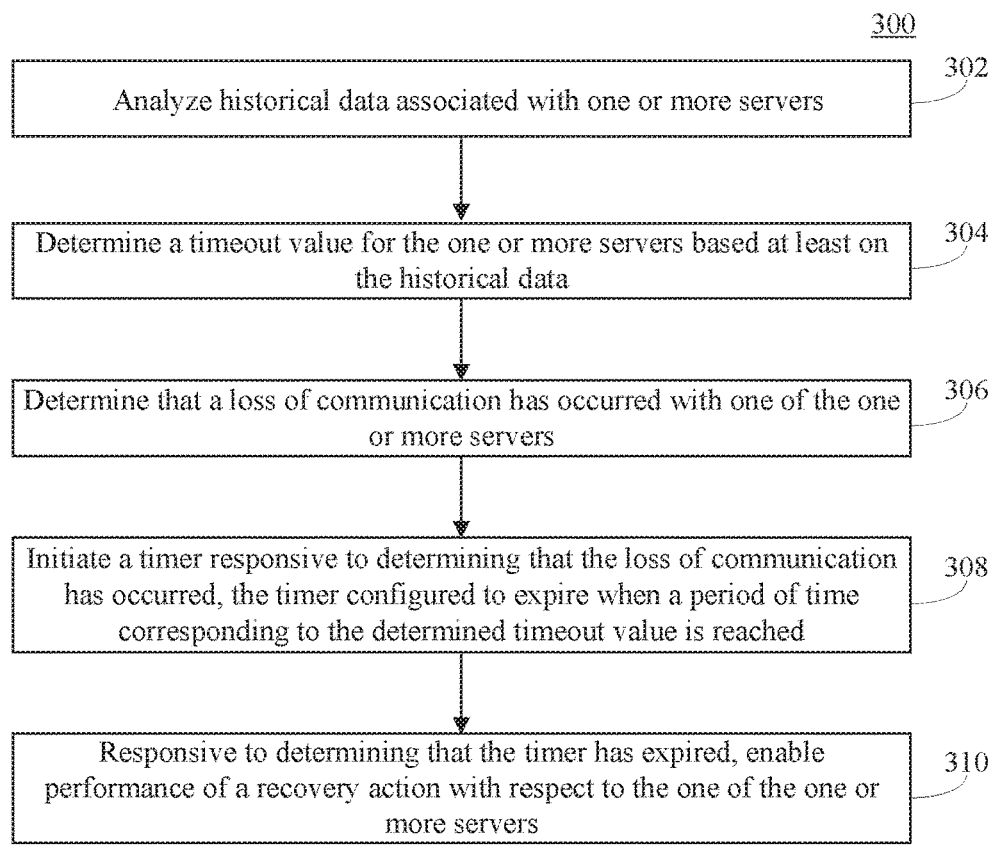
FIG. 3 shows a flowchart of a method for minimizing the downtime for a node, according to an example embodiment.
Figure 4:
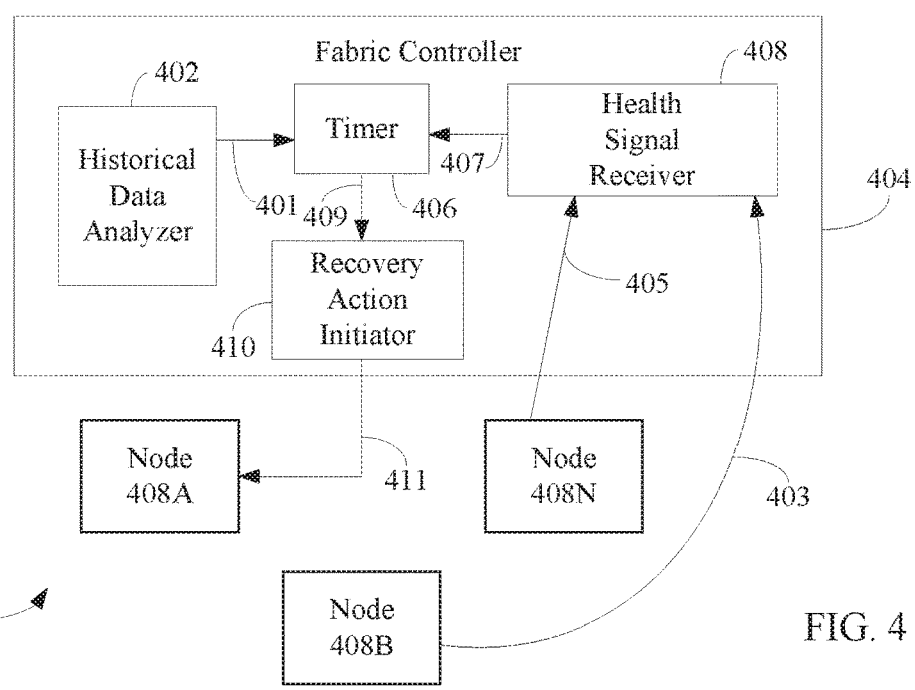
FIG. 4 is a block diagram of a system comprising a fabric controller, a first node, a second node, and a third node, according to an example embodiment.

Accordingly, the downtime experienced by a node of a network-accessible server set may be reduced/minimized in many ways. For example, FIG. 3 is a method for reducing the downtime for a node in accordance with an embodiment. In an embodiment, flowchart 300 may be implemented by fabric controller 404, as shown in FIG. 4. FIG. 4 is a block diagram of a system 400 comprising a fabric controller 404, a first node 408A, a second node 408B, and a third node 408N. Fabric controller 404 is an example of fabric controller 104A, first node 408A is an example of node 108A, second node 408B is an example of node 108B, and third node 408N is an example of node 108N, as described above with reference to FIG. 1. As shown in FIG. 4, fabric controller 404 comprises a historical data analyzer 402, a timer 406, a health signal receiver 408, and a recovery action initiator 410. Other structural and operational embodiments will be apparent to persons skilled in the relevant art(s) based on the following discussion regarding flowchart 300 and system 400 of FIG. 4.

Flowchart 300 begins with step 302. In step 302, historical data associated with one or more servers are analyzed. For example, with reference to FIG. 4, historical data analyzer 402 analyzes historical data associated with nodes 408A, 408B, and 408N.

In accordance with one or more embodiments, the historical data may comprise at least one of a first record of one or more operational states into which the one or more servers entered or a second record of an amount of time in which the one or more servers were in each of the one or more operational states.

In step 304, a timeout value for the one or more servers is determined based at least on the historical data. For example, with reference to FIG. 4, historical data analyzer 402 determines a timeout value 401 based at least on the historical data.

In accordance with one or more embodiments, the timeout value is determined as a function of a recovery action cost indicative of a time for the one or more servers to recover after performing the recovery action (e.g., $C_{int}$, as described above with reference to Equation 7), and a likelihood that the one or more servers will self-recover without performing the recovery action (e.g., $f_T(\tau)$, as described above with Equation 7).

It is noted that an entity other than fabric controller 404 may determine the timeout value. For example, a node executing within the same cluster as fabric controller 404 and/or another cluster may be configured to receive the historical data obtained by fabric controller (e.g., records 200A and 200B, as shown in FIGS. 2A-2B) and determine the optimal timeout value based on such historical data. The timeout value may be provided to fabric controller 404 for implementation thereby.

In step 306, a determination is made that a communication loss has occurred with one of the one or more servers. For example, as shown in FIG. 4, health signal receiver 408 may be configured to determine whether a loss of communication has occurred with respect to one of nodes 408A, 408B, or 408N.

In accordance with one or more embodiments, a loss of communication is determined to have occurred with one of the one or more servers by determining that a periodic status signal provided by the one of the one or more servers was not received before expiration of a predetermined time interval. For example, with reference to FIG. 4, health signal receiver 408 is configured to receive periodic status (or "health") signals from each of nodes 408A, 408B, and 408N. In the example shown in FIG. 4, health signal receiver 408 has received a status signal 403 from node 408B and a status signal 405 from node 408N within a predetermined time interval, but has not received a status signal from node 408A within the predetermined time interval. Thus, health signal receiver 408 determines that a loss of communication has occurred with respect to node 408A and provides a notification 407 to timer 406 that indicates that a loss of communication has occurred with respect to node 408A.

In step 308, a timer is initiated responsive to determining that the loss of communication has occurred. The timer is configured to expire when a period of time corresponding to the determined timeout value is reached. For example, with reference to FIG. 4, timer 406 is initiated responsive to receiving notification 407.

In step 310, responsive to determining that the timer has expired, performance of a recovery action is enabled with respect to the one of the one or more servers. For instance, with reference to FIG. 4, responsive to determining that timer 406 has expired, timer 406 provides a notification 409 to recovery action initiator 410 that enables recovery action initiator 410 to perform a recovery action.

Various types of recovery actions may be enabled and performed. In accordance with one or more embodiments, the recovery action comprises providing a signal to the one of the one or more servers that causes the one of the one or more servers to reboot. For instance, with reference to FIG. 4, recovery action initiator 410 provides a signal 411 to node 408A that causes node 408 to reboot. Signal 411 may be provided directly to node 408A (as shown in FIG. 4), or alternatively, may be provided to a power distribution unit (not shown) communicatively coupled to each of nodes 408A, 408B, and 408N, which provides signal 411 to node 408A.

In accordance with one or more embodiments, the historical data comprises non-parametric historic data that indicates an average downtime experienced by the one or more servers with respect to a plurality of different timeout values. In accordance with such embodiments, the timeout value is set to a selected timeout value of the plurality of different timeout values that resulted in the lowest average downtime.

B. Timeout Value Fallback Mechanisms

For new clusters which are built out (e.g., added) to a network-accessible server set, historical data for such clusters will not be available to compute the optimal intervention threshold. In accordance with an embodiment, a new cluster's fabric controller utilizes a fallback mechanism that enables the fabric controller to utilize a less optimal intervention threshold value, but more optimal than the statically configured value (e.g., a default intervention threshold value). For example, an optimum intervention threshold may be determined on per cluster level basis (as described above in Subsection A) as well as per datacenter level (e.g., a node within the network-accessible server set may be configured to determine the optimum intervention threshold at the datacenter level by averaging the optimum intervention thresholds calculated for each cluster included in the datacenter). Using this information the fabric controller of the new cluster may generate a multi child decision tree.

Figure 5:
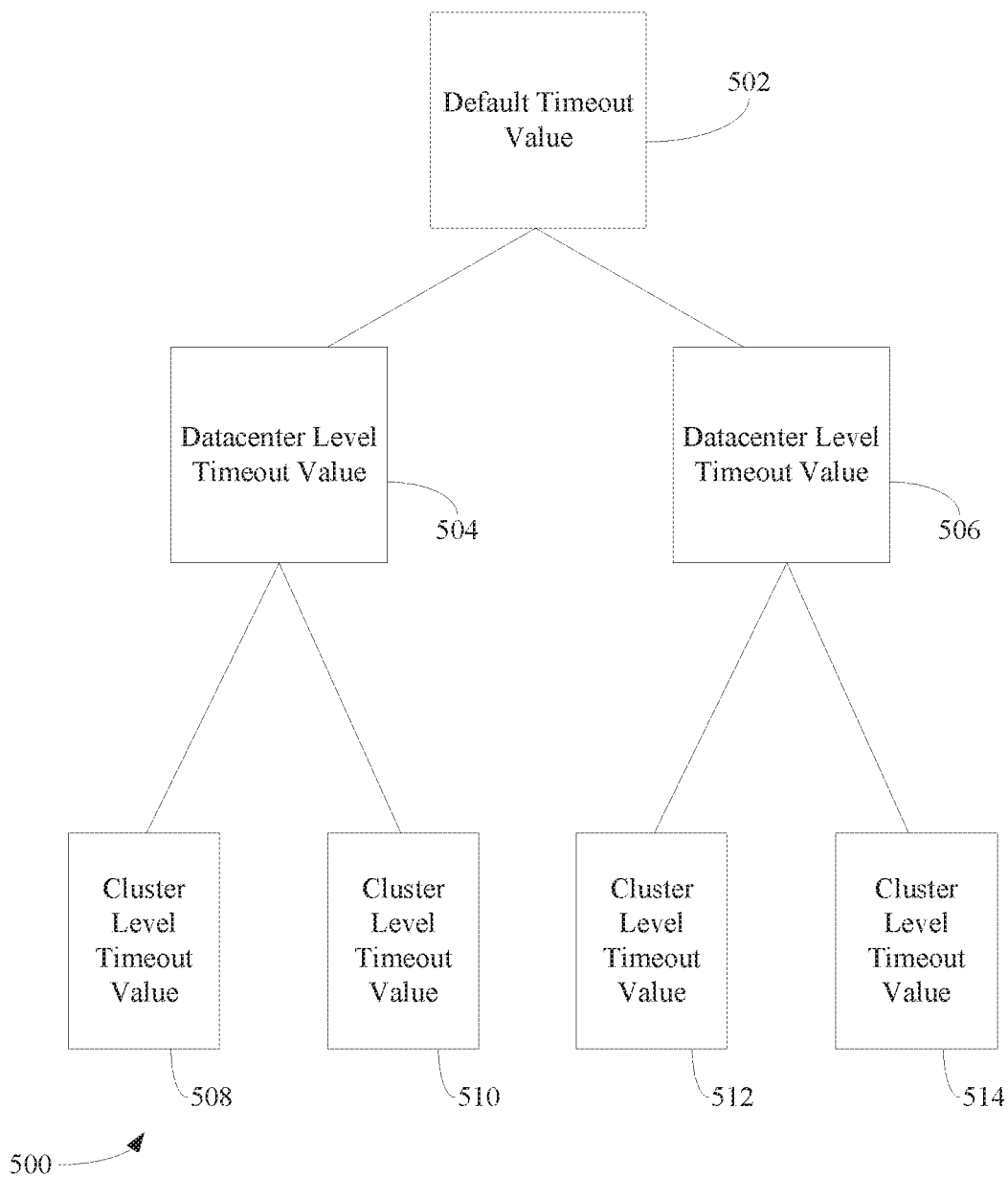
FIG. 5 is a block diagram of a multi-child decision tree generated by a fabric controller, according to an example embodiment.

FIG. 5 is a block diagram of a multi-child decision tree 500 generated by a fabric controller in accordance with an embodiment. Multi-child decision tree 500 comprises a root 502, and leaves 504, 506, 508, 510 510, and 514. Root 502 of tree 500 represents the default (statically-configured) timeout value. The first level leaves (leaves 504 and 506) represent the optimal timeout values computed at the datacenter level (i.e., for each datacenter of the network-accessible server set). The second level leaves (leaves 508, 510, 512, and 514) represent the optimal timeout values computed for each cluster within the network-accessible server set. Tree 500 may be further extended so that optimal threshold values may be computed for specific nodes within each cluster to obtain even more accurate threshold values. When a new cluster is built out and if decision tree 500 does not have an optimal threshold value for that specific cluster, then the new cluster's fabric controller falls back to the datacenter level timeout value. Similarly, if a new datacenter is built out and decision tree 500 does not have an optimum threshold value for that datacenter, then the fabric controller(s) for the cluster(s) of the new datacenter may fall back to the default timeout value. Over time, after the fabric controller(s) for the newly-built out cluster(s) obtain sufficient historical data, the feedback mechanism ensures that optimal threshold values are computed using that obtained historical data. Thereafter, the fabric controller(s) utilize the newly-computed threshold values to minimize the downtime experienced by their associated nodes.

Figure 6:
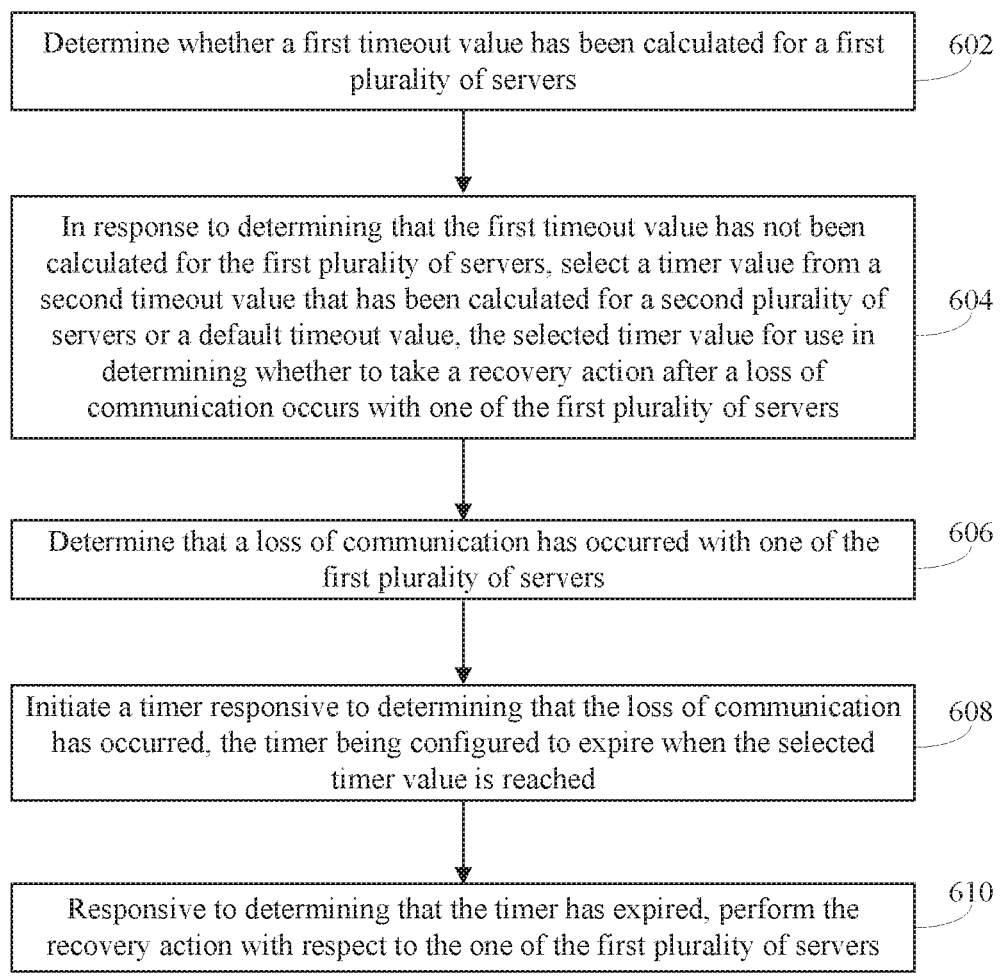
FIG. 6 shows a flowchart of a method for minimizing the downtime experienced by newly-built out nodes of a network-accessible server set by using a fallback mechanism, according to an example embodiment.
Figure 7:
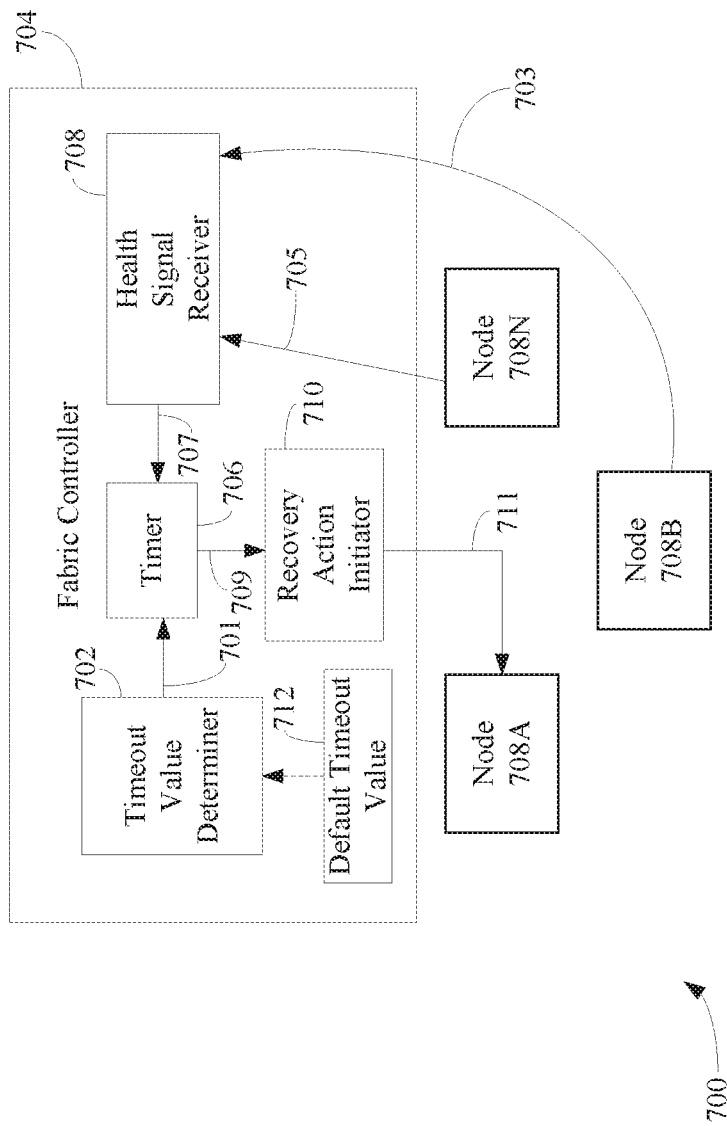
FIG. 7 is a block diagram of a system comprising a fabric controller, a first node, a second node, and a third node, according to another example embodiment.

Accordingly, the downtime experienced by newly-built out nodes of a network-accessible server set may be minimized by using a fallback mechanism in many ways. For example, FIG. 6 shows a flowchart 600 of a method for minimizing the downtime experienced by newly-built out nodes of a network-accessible server set by using a fallback mechanism in accordance with an embodiment. In an embodiment, flowchart 600 may be implemented by fabric controller 704, as shown in FIG. 7. FIG. 7 is a block diagram of a system 700 comprising fabric controller 704, a first node 708A, a second node 708B, and a third node 708N. Fabric controller 704 is an example of fabric controller 404A, first node 708A is an example of node 408A, second node 708B is an example of node 408B, and third node 708N is an example of node 408N, as described above with reference to FIG. 4. Nodes 708A, 708B, and 708N may be included in the same cluster. As shown in FIG. 7, fabric controller 704 comprises a timeout value determiner 702, a timer 706, a health signal receiver 708, and a recovery action initiator 710. Timer 706, health signal receiver 708, and recovery action initiator 710 are examples of timer 406, health signal receiver 408, and recovery action initiator 410, as shown in FIG. 4. Other structural and operational embodiments will be apparent to persons skilled in the relevant art(s) based on the following discussion regarding flowchart 600 and system 700 of FIG. 7.

Flowchart 600 begins with step 602. In step 602, a determination is made as to whether a first timeout value has been calculated for a first plurality of servers. For example, with reference to FIG. 7, timeout value determiner 702 may determine whether a first timeout value has been calculated for nodes 708A, 708B, and 708N. For instance, timeout value determiner 702 may analyze a decision tree (e.g., decision tree 500, as shown in FIG. 5) to determine whether a timeout value has been determined for nodes 708A, 708B, and 708N.

In step 604, in response to determining that the first timeout value has not been calculated for the first plurality of servers, a second timeout value that has been calculated for a second plurality of servers or a default timeout value is selected for a timer value. The selected timer value is used in determining whether to take a recovery action after a loss of communication occurs with one of the first plurality of servers. For instance, with reference to FIG. 7, timeout value determiner 702 may analyze tree 500 to determine if timeout value was calculated at the datacenter level of the network-accessible server set in which nodes 708A, 708B, and 708 are included. If a timeout value was calculated at the datacenter level, then fabric controller 704 selects that timeout value. If a timeout value was not calculated at the datacenter level, then fabric controller 704 may utilize a default timeout value 712. Default timeout value 712 may be stored in a memory (not shown) or other storage device of fabric controller 704.

In accordance with one or more embodiments, the second timeout value is determined based on an analysis of historical data associated with the second plurality of servers.

In accordance with one or more embodiments, the historical data comprises at least one of a first record of one or more operational states into which the second plurality of servers entered or a second record of an amount of time in which the second plurality of servers were in each of the one or more operational states.

In accordance with one or more embodiments, the second timeout value is determined as a function of a recovery action cost indicative of a time for the second plurality of servers to recover after performing the recovery action (e.g., $C_{int}$, as described above with reference to Equation 7), and a likelihood that the second plurality of servers will self-recover without performing the recovery action (e.g., $f_T(\tau)$, as described above with Equation 7).

In step 606, a determination is made that a communication loss has occurred with one of the first plurality of severs. For example, as shown in FIG. 7, health signal receiver 708 may be configured to determine whether a loss of communication has occurred with respect to one of nodes 708A, 708B, or 708N.

In accordance with one or more embodiments, a loss of communication is determined to have occurred with one of the first plurality of servers by determining that a periodic status signal provided by the one of the first plurality of servers was not received before expiration of a predetermined time interval. For example, with reference to FIG. 7, health signal receiver 708 is configured to receive periodic status (or "health") signals from each of nodes 708A, 708B, and 708N. In the example shown in FIG. 7, health signal receiver 708 has received a status signal 703 from node 708B and a status signal 705 from node 708N within a predetermined time interval, but has not received a status signal from node 708A within the predetermined time interval. Thus, health signal receiver 708 determines that a loss of communication has occurred with respect to node 708A and provides a notification 707 to timer 706 that indicates that a loss of communication has occurred with respect to node 708A.

In step 708, a timer is initiated responsive to determining that the loss of communication has occurred. In an embodiment, a timer mechanism operates an internal timer configured to expire when a period of time corresponding to the determined timeout value is reached. For example, with reference to FIG. 7, timer 706 is initiated responsive to receiving notification 707.

In step 710, responsive to determining that the timer has expired, the recovery action is performed with respect to the one of the first plurality of severs. For instance, with reference to FIG. 7, responsive to determining that timer 706 has expired, timer 706 provides a notification 709 to recovery action initiator 710 and recovery action initiator 710 performs a recovery action.

In accordance with one or more embodiments, the recovery action comprises providing a signal to the one of the first plurality of servers that causes one of the first plurality of servers to reboot. For instance, with reference to FIG. 7, recovery action initiator 710 provides a signal 711 to node 708A that causes node 708A to reboot. Signal 711 may be provided directly to node 708A (as shown in FIG. 7), or alternatively, may be provided to a power distribution unit (not shown) communicatively coupled to each of nodes 708A, 708B, and 708N, which provides signal 711 to node 708A.

In accordance with one or more embodiments, the historical data comprises non-parametric historic data that indicates an average downtime experienced by the first plurality of servers with respect to a plurality of different timeout values. In accordance with such embodiments, the second timeout value being based on a timeout value of the plurality of different timeout values that resulted in the lowest average downtime.

III. Example Mobile and Stationary Device Embodiments

Nodes 108A-108N, nodes 112A-112N, node 114A-114N, fabric controllers 104A, 104B, and 104N, fabric controller 404, historical data analyzer 402, timer 406, health signal receiver 408, recovery action initiator 410, nodes 408A, 408B, and 408N, fabric controller 704, timeout value determiner 702, timer 706, health signal receiver 708, recovery action initiator 710, nodes 708A, 708B, and 708N, flowchart 300, and/or flowchart 600 may be implemented together in a system-on-a-chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
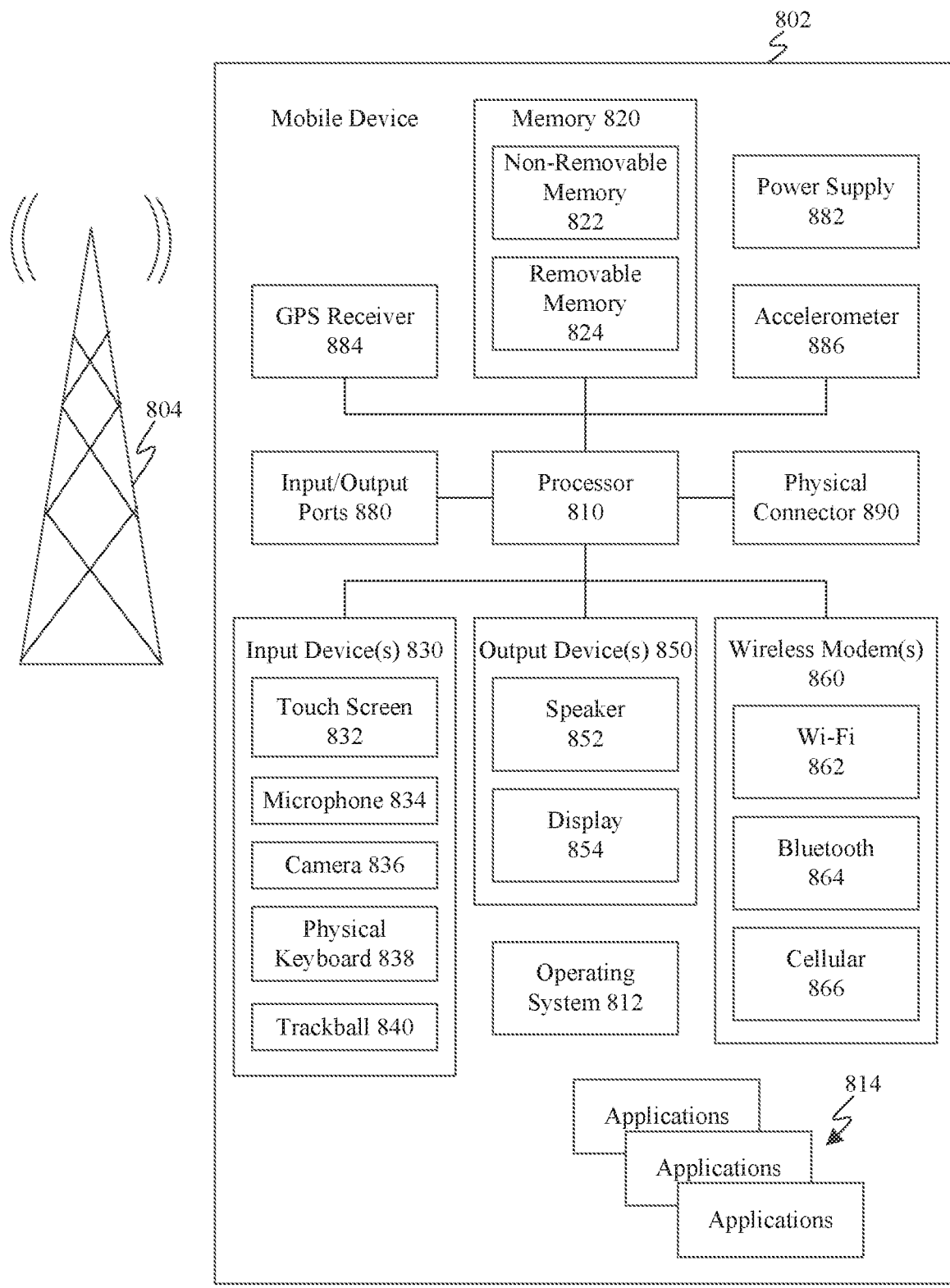
FIG. 8 is a block diagram of an exemplary user device in which embodiments may be implemented.

FIG. 8 shows a block diagram of an exemplary mobile device 800 including a variety of optional hardware and software components, shown generally as components 802. Any number and combination of the features/elements of components 802 may be included in a mobile device embodiment, as well as additional and/or alternative features/elements, as would be known to persons skilled in the relevant art(s). It is noted that any of components 802 can communicate with any other of components 802, although not all connections are shown, for ease of illustration. Mobile device 800 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 804, such as a cellular or satellite network, or with a local area or wide area network.

The illustrated mobile device 800 can include a controller or processor referred to as processor circuit 810 for performing such tasks as signal coding, image processing, data processing, input/output processing, power control, and/or other functions. Processor circuit 810 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 810 may execute program code stored in a computer readable medium, such as program code of one or more applications 814, operating system 812, any program code stored in memory 820, etc. Operating system 812 can control the allocation and usage of the components 802 and support for one or more application programs 814 (a.k.a. applications, "apps", etc.). Application programs 814 can include common mobile computing applications (e.g., email applications, calendars, contact managers, web browsers, messaging applications) and any other computing applications (e.g., word processing applications, mapping applications, media player applications).

As illustrated, mobile device 800 can include memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in GSM communication systems, or other well-known memory storage technologies, such as "smart cards." The memory 820 can be used for storing data and/or code for running the operating system 812 and the applications 814. Example data can include web pages, text, images, sound files, video data, or other data sets to be sent to and/or received from one or more network servers or other devices via one or more wired or wireless networks. Memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 820. These programs include operating system 812, one or more application programs 814, and other program modules and program data. Examples of such application programs or program modules may include, for example, computer program logic (e.g., computer program code or instructions) for implementing nodes 108A-108N, nodes 112A-112N, node 114A-114N, fabric controllers 104A, 104B, and 104N, fabric controller 404, historical data analyzer 402, timer 406, health signal receiver 408, recovery action initiator 410, nodes 408A, 408B, and 408N, fabric controller 704, timeout value determiner 702, timer 706, health signal receiver 708, recovery action initiator 710, nodes 708A, 708B, and 708N, flowchart 300, and/or flowchart 600.

Mobile device 800 can support one or more input devices 830, such as a touch screen 832, microphone 834, camera 836, physical keyboard 838 and/or trackball 840 and one or more output devices 850, such as a speaker 852 and a display 854.

Other possible output devices (not shown) can include piezoelectric or other haptic output devices. Some devices can serve more than one input/output function. For example, touch screen 832 and display 854 can be combined in a single input/output device. The input devices 830 can include a Natural User Interface (NUI).

Wireless modem(s) 860 can be coupled to antenna(s) (not shown) and can support two-way communications between processor circuit 810 and external devices, as is well understood in the art. The modem(s) 860 are shown generically and can include a cellular modem 866 for communicating with the mobile communication network 804 and/or other radio-based modems (e.g., Bluetooth 864 and/or Wi-Fi 862). Cellular modem 866 may be configured to enable phone calls (and optionally transmit data) according to any suitable communication standard or technology, such as GSM, 3G, 4G, 5G, etc. At least one of the wireless modem(s) 860 is typically configured for communication with one or more cellular networks, such as a GSM network for data and voice communications within a single cellular network, between cellular networks, or between the mobile device and a public switched telephone network (PSTN).

Mobile device 800 can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components 802 are not required or all-inclusive, as any components can be not present and other components can be additionally present as would be recognized by one skilled in the art.

Figure 9:
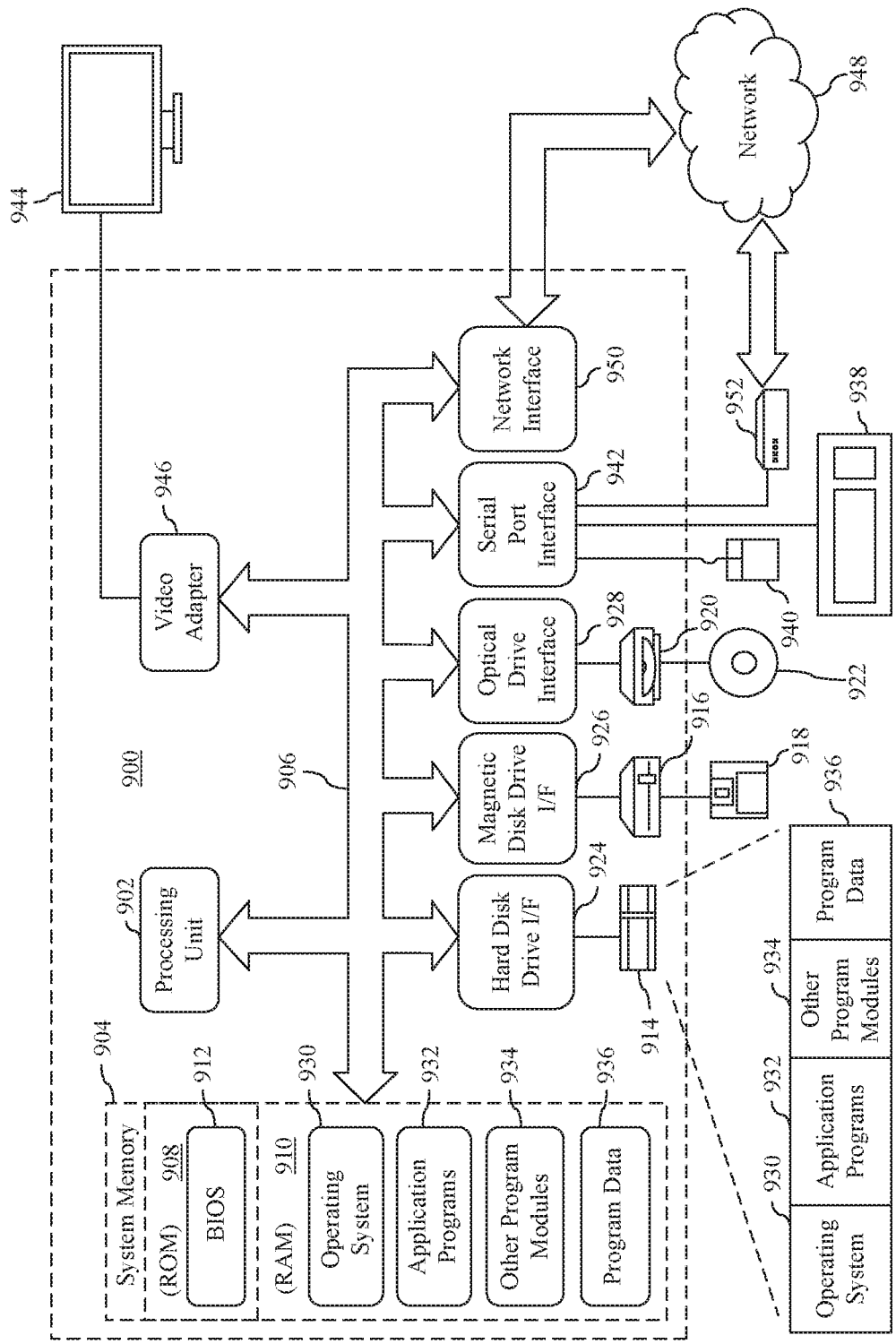
FIG. 9 is a block diagram of an example computing device that may be used to implement embodiments.

Furthermore, FIG. 9 depicts an exemplary implementation of a computing device 900 in which embodiments may be implemented. The description of computing device 900 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing nodes 108A-108N, nodes 112A-112N, node 114A-114N, fabric controllers 104A, 104B, and 104N, fabric controller 404, historical data analyzer 402, timer 406, health signal receiver 408, recovery action initiator 410, nodes 408A, 408B, and 408N, fabric controller 704, timeout value determiner 702, timer 706, health signal receiver 708, recovery action initiator 710, nodes 708A, 708B, and 708N, flowchart 300, and/or flowchart 600.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to generally refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including system memory 904 of FIG. 9). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 952, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

A method is described herein. The method includes: analyzing historical data associated with one or more servers; determining a timeout value for the one or more servers based at least on the historical data; determining that a loss of communication has occurred with one of the one or more servers; initiating a timer responsive to determining that the loss of communication has occurred, the timer configured to expire when a period of time corresponding to the determined timeout value is reached; and responsive to determining that the timer has expired, enabling performance of a recovery action with respect to the one of the one or more servers.

In one embodiment of the foregoing method, the recovery action comprises providing a signal to the one of the one or more servers that causes the one of the one or more servers to reboot.

In another embodiment of the foregoing method, the historical data comprises at least one of: a first record of one or more operational states into which the one or more servers entered; or a second record of an amount of time in which the one or more servers were in each of the one or more operational states.

In a further embodiment of the foregoing method, said determining a timeout value comprises: determining the timeout value as a function of: a recovery action cost indicative of a time for the one or more servers to recover after performing the recovery action, and a likelihood that the one or more servers will self-recover without performing the recovery action.

In yet another embodiment of the foregoing method, said determining that a loss of communication has occurred with the one of the one or more servers comprises: determining that a periodic status signal provided by the one of the one or more servers was not received before expiration of a predetermined time interval.

In still another embodiment of the foregoing method, the historical data comprises: an average downtime experienced by the one or more servers with respect to a plurality of different timeout values.

In another embodiment of the foregoing method, said determining a timeout value comprises: setting the timeout value to a selected timeout value of the plurality of different timeout values that resulted in the lowest average downtime.

A system is described. The system comprises: a first plurality of servers, one or more of the first plurality of servers configured to: determine whether a first timeout value has been calculated for the first plurality of servers; in response to determining that the first timeout value has not been calculated for the first plurality of servers, select a timer value from a second timeout value that has been calculated for a second plurality of servers or a default timeout value, the selected timer value for use in determining whether to take a recovery action after a loss of communication occurs with one of the first plurality of servers; determine that a loss of communication has occurred with one of the first plurality of servers; initiate a timer responsive to determining that the loss of communication has occurred, the timer being configured to expire when the selected timer value is reached; and responsive to determining that the timer has expired, perform the recovery action with respect to the one of the first plurality of servers.

In one embodiment of the foregoing system, to perform the recovery action, a signal is provided to the one of the first plurality of servers that causes the one of the first plurality of servers to reboot.

In another embodiment of the foregoing system, the second timeout value is determined based on an analysis of historical data associated with the second plurality of servers.

In yet another embodiment of the foregoing system, the historical data comprises at least one of: a first record of one or more operational states in which the second plurality of servers entered; or a second record of an amount of time in which the second plurality of servers were in each of the one or more operational states.

In still another embodiment of the foregoing system, the second timeout value is a function of: a recovery action cost indicative of a time for the second plurality of servers to recover after performing the recovery action, and a likelihood that the second plurality of servers will self-recover without performing the recovery action.

In yet another embodiment of the foregoing system, to determine that a loss of communication has occurred with one of the first plurality of servers, a periodic status signal provided by the one of the second plurality of servers is determined to not be received before expiration of a predetermined time interval.

In still another embodiment of the foregoing system, the historical data comprises: an average downtime experienced by the first plurality of servers for a plurality of different timeout values, the second timeout value being based on a timeout value of the plurality of different timeout values that resulted in the lowest average downtime.

A computer-readable storage medium having program instructions recorded thereon that, when executed by at least one processing circuit, perform a method, the method comprising: analyzing historical data associated with a plurality of nodes; determining a timeout value for the plurality of nodes based at least on the historical data; determining that a loss of communication has occurred with one of the plurality of nodes; initiating a timer responsive to determining that the loss of communication has occurred, the timer configured to expire when a period of time corresponding to the determined timeout value is reached; and responsive to determining that the timer has expired, enabling performance a recovery action with respect to the one of the plurality of nodes.

In one embodiment of the foregoing computer-readable storage medium, the recovery action comprises: providing a signal to the one of the plurality of nodes that causes the one of the plurality of nodes to reboot.

In another embodiment of the foregoing method, the historical data comprises at least one of: a first record of one or more operational states in which the plurality of nodes entered; or a second record of an amount of time in which the plurality of nodes were in each of the one or more operational states.

In a further embodiment of the foregoing computer-readable storage medium, said determining a timeout value comprises: determining the timeout value as a function of a recovery action cost indicative of a time for the plurality of nodes to recover after performing the recovery action, and a likelihood that the plurality of nodes will self-recover without performing the recovery action.

In yet another embodiment of the foregoing computer-readable storage medium, said determining that a loss of communication has occurred with the one of the plurality of nodes comprises: determining that a periodic status signal provided by the one of the one or more servers was not received before expiration of a predetermined time interval.

In still another embodiment of the foregoing computer-readable storage medium, the historical data comprises: an average downtime experienced by the plurality of nodes with respect to a plurality of different timeout values.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
    analyzing historical data associated with one or more servers;
    determining a timeout value for the one or more servers based at least on the historical data, the historical data comprising at least one of a first record of one or more operational states into which the one or more servers entered or a second record of an amount of time in which the one or more servers were in each of the one or more operational states, the timeout value being determined as a function of:
        a recovery action cost indicative of a time for the one or more servers to recover after performing the recovery action, and
        a likelihood that the one or more servers will self-recover without performing the recovery action;
    determining that a loss of communication has occurred with one of the one or more servers;
    initiating a timer responsive to determining that the loss of communication has occurred, the timer configured to expire when a period of time corresponding to the determined timeout value is reached; and
    responsive to determining that the timer has expired, enabling performance of a recovery action with respect to the one of the one or more servers.

2. The method of claim 1, wherein the recovery action comprises:
    providing a signal to the one of the one or more servers that causes the one of the one or more servers to reboot.

3. The method of claim 1, wherein determining that a loss of communication has occurred with the one of the one or more servers comprises:
    determining that a periodic status signal provided by the one of the one or more servers was not received before expiration of a predetermined time interval.

4. The method of claim 1, wherein the historical data further comprises:
    an average downtime experienced by the one or more servers with respect to a plurality of different timeout values.

5. The method of claim 4, wherein said determining a timeout value comprises:
    setting the timeout value to a selected timeout value of the plurality of different timeout values that resulted in the lowest average downtime.

6. A system, comprising:
    a first plurality of servers, one or more of the first plurality of servers configured to:
        determine whether a first timeout value has been calculated for the first plurality of servers;
        in response to determining that the first timeout value has not been calculated for the first plurality of servers, set a timer value based on a second timeout value that has been calculated for a second plurality of servers, the second timeout value being determined based on an analysis of historical data associated with the second plurality of servers, the historical data comprising at least one of a first record of one or more operational states into which the second plurality of servers entered or a second record of an amount of time in which the second plurality of servers were in each of the one or more operational states, the selected timer value for use in determining whether to take a recovery action after a loss of communication occurs with one of the first plurality of servers;

determine that a loss of communication has occurred with one of the first plurality of servers;

initiate a timer responsive to determining that the loss of communication has occurred, the timer being configured to expire when the selected timer value is reached; and responsive to determining that the timer has expired, perform the recovery action with respect to the one of the first plurality of servers.

7. The system of claim 6, wherein to perform the recovery action, a signal is provided to the one of the first plurality of servers that causes the one of the first plurality of servers to reboot.

8. The system of claim 6, wherein the second timeout value is a function of:
a recovery action cost indicative of a time for the second plurality of servers to recover after performing the recovery action, and
a likelihood that the second plurality of servers will self-recover without performing the recovery action.

9. The system of claim 6, wherein to determine that a loss of communication has occurred with one of the first plurality of servers, a periodic status signal provided by the one of the second plurality of servers is determined to not be received before expiration of a predetermined time interval.

10. The system of claim 6, wherein the historical data further comprises:
an average downtime experienced by the first plurality of servers for a plurality of different timeout values, the second timeout value being based on a timeout value of the plurality of different timeout values that resulted in the lowest average downtime.

11. A computer-readable storage device having program instructions recorded thereon that, when executed by at least one processing circuit, perform a method, the method comprising:
analyzing historical data associated with a plurality of nodes;
determining a timeout value for the plurality of nodes based at least on the historical data, the historical data comprising at least one of a first record of one or more operational states into which the plurality of nodes entered or a second record of an amount of time in which the plurality of nodes were in each of the one or more operational states, the timeout value being determined as a function of:
a recovery action cost indicative of a time for the plurality of nodes to recover after performing the recovery action, and
a likelihood that the plurality of nodes will self-recover without performing the recovery action;
determining that a loss of communication has occurred with one of the plurality of nodes;
initiating a timer responsive to determining that the loss of communication has occurred, the timer configured to expire when a period of time corresponding to the determined timeout value is reached; and
responsive to determining that the timer has expired, enabling performance a recovery action with respect to the one of the plurality of nodes.

12. The computer-readable storage device of claim 11, wherein the recovery action comprises:
providing a signal to the one of the plurality of nodes that causes the one of the plurality of nodes to reboot.

13. The computer-readable storage device of claim 11, wherein determining that a loss of communication has occurred with the one of the plurality of nodes comprises:
determining that a periodic status signal provided by the one of the plurality of nodes was not received before expiration of a predetermined time interval.

14. The computer-readable storage device of claim 11, wherein the historical data further comprises:
an average downtime experienced by the plurality of nodes with respect to a plurality of different timeout values.

15. The method of claim 1, wherein the recovery action cost is determined based on an analysis of an average time it takes for the one or more servers to transition from an unhealthy state to a ready state.

16. The computer-readable storage device of claim 14, wherein said determining a timeout value comprises:
setting the timeout value to a selected timeout value of the plurality of different timeout values that resulted in the lowest average downtime.

17. The method of claim 1, wherein the timeout value is periodically re-determined.

18. The system of claim 8, wherein the recovery action cost is determined based on an analysis of an average time it takes for the second plurality servers to transition from an unhealthy state to a ready state.

19. The computer-readable storage device of claim 11, wherein the timeout value is periodically re-determined.

20. The computer-readable storage device of claim 11, wherein the recovery action cost is determined based on an analysis of an average time it takes for the plurality of nodes to transition from an unhealthy state to a ready state.

* * * * *